(12) United States Patent
Calvarese et al.

(10) Patent No.: US 10,142,798 B2
(45) Date of Patent: Nov. 27, 2018

(54) ARRANGEMENT FOR, AND METHOD OF, LOCATING A MOBILE DEVICE IN A VENUE BY INFERRING TRANSIT TIMER VALUES OF RANGING SIGNALS RECEIVED BY THE MOBILE DEVICE IN A TIME DIFFERENCE OF ARRIVAL (TDOA)-BASED ULTRASONIC LOCATIONING SYSTEM

(71) Applicant: SYMBOL TECHNOLOGIES, LLC, Lincolnshire, IL (US)

(72) Inventors: Russell E. Calvarese, Stony Brook, NY (US); Mark P. Orlassino, Centereach, NY (US); Umberto R. Scaramozzino, Port Jefferson, NY (US); Larry Maniscalco, Islip, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 164 days.

(21) Appl. No.: 15/232,448

(22) Filed: Aug. 9, 2016

(65) Prior Publication Data

US 2018/0049004 A1    Feb. 15, 2018

(51) Int. Cl.
*H04W 24/00*  (2009.01)
*H04W 4/04*   (2009.01)
*H04L 29/06*  (2006.01)
*H04L 29/08*  (2006.01)
*G01S 5/22*   (2006.01)
*H04W 4/029*  (2018.01)

(52) U.S. Cl.
CPC ............... *H04W 4/04* (2013.01); *G01S 5/22* (2013.01); *H04L 67/12* (2013.01); *H04L 69/28* (2013.01); *H04W 4/029* (2018.02)

(58) Field of Classification Search
None
See application file for complete search history.

(56) References Cited

U.S. PATENT DOCUMENTS

| 8,090,065 B2 | 1/2012 | Gabrielson et al. |
| 8,193,984 B2 | 6/2012 | Ward |
| 2008/0089255 A1* | 4/2008 | Graves ............... H04W 8/22 370/310 |
| 2012/0044786 A1 | 2/2012 | Booij et al. |
| 2013/0083631 A1* | 4/2013 | Harrell ............... G01S 5/18 367/127 |

FOREIGN PATENT DOCUMENTS

EP    2866046 A1 *   4/2015   ......... G01S 5/0045

* cited by examiner

*Primary Examiner* — German Viana Di Prisco
(74) *Attorney, Agent, or Firm* — Yuri Astvatsaturov

(57) ABSTRACT

Ultrasonic transmitters periodically transmit ranging signals at unknown transmit timer values, and an ultrasonic receiver receives the ranging signals at known receive timer values on a mobile device in a venue in which a time difference of arrival (TDOA)-based ultrasonic locationing system is deployed. A controller infers the transmit timer values, and determines a current, real-time position of the mobile device based on flight time differences between the transmit timer values inferred by the controller and the known receive timer values.

18 Claims, 6 Drawing Sheets

ARRANGEMENT FOR, AND METHOD OF, LOCATING A MOBILE DEVICE IN A VENUE BY INFERRING TRANSIT TIMER VALUES OF RANGING SIGNALS RECEIVED BY THE MOBILE DEVICE IN A TIME DIFFERENCE OF ARRIVAL (TDOA)-BASED ULTRASONIC LOCATIONING SYSTEM

BACKGROUND OF THE INVENTION

The present disclosure relates generally to an arrangement for, and a method of, locating and tracking a mobile device that is movable in a venue by transmitting ultrasonic ranging signals in a time difference of arrival (TDOA)-based ultrasonic locationing system to an ultrasonic receiver on the mobile device, and, more particularly, to inferring transmit timer values of the ranging signals to simplify and expedite operation of the TDOA-based locationing system in accurately locating the mobile device.

It is known to deploy a real-time ultrasonic locationing system in a venue to locate and to track a mobile device that is movable in the venue. The known ultrasonic locationing system includes an ultrasonic transmitter subsystem having a plurality of ultrasonic transmitters mounted at fixed, known locations spaced apart in the venue, each ultrasonic transmitter being operative, in its turn, for periodically transmitting ultrasonic ranging signals, e.g., ultrasonic pulses in the 20-22 kHz frequency range, to an ultrasonic receiver subsystem having a receiver, e.g., a microphone, mounted on, and jointly movable with, the mobile device. The ultrasonic locationing system locates the position, and tracks the movement, of the mobile device along a tracking path within the venue, typically by using flight time measurements known in the art that incorporate triangulation, trilateration, multilateration, and like techniques.

One type of known flight time measurements employs time of arrival (TOA) or time of flight (TOF) techniques, in which the ranging signals are transmitted at known transmit timer values, and in which the ranging signals are received by the receiver at known receive timer values. The flight time difference between the known transmit timer values at which each ranging signal is transmitted and the known receive timer values at which each ranging signal is received, together with the known speed of each ranging signal, as well as with the known locations of the transmitters, are used, among other factors, such as temperature and humidity, to determine the distance from each transmitter to the receiver mounted on the mobile device, and, in turn, the location of the mobile device. Synchronization between the transmit timer values and the receive timer values is necessary in a TOA/TOF-based system.

Another type of known flight time measurements employs time difference of arrival (TDOA) techniques, in which the transmit timer values of the ranging signals transmitted by the transmitters are not known. The receive timer values of the ranging signals are known, but there is no synchronization between the transmit timer values and the receive timer values. More particularly, the ranging signals transmitted by a first pair of transmitters deployed at fixed, known locations in a TDOA-based locationing system are received by the receiver and generally indicate that the mobile device may be located at any one of a multitude of possible locations that may be plotted as a two-sheeted, first hyperboloid. The ranging signals transmitted by a third such transmitter and received by the receiver generally indicate that the mobile device may be located at any one of another multitude of possible locations that may be plotted as a second hyperboloid. When considered together, the mobile device may be located on the curve along which the first and second hyperboloids intersect. The ranging signals transmitted by a fourth such transmitter and received by the receiver generally indicate that the mobile device may be located at any one of still another multitude of possible locations that may be plotted as a third hyperboloid. When all are considered together, the mobile device may be located at one or two points, one for each of the two sheets of the first hyperboloid, where all the hyperboloids intersect. A fifth such transmitter may be needed to resolve the ambiguity between the two points unless one of the points can be excluded due to physical constraints, such as by being located above a ceiling of the venue.

Hence, the TDOA-based system generally requires more transmitters as compared to a TOA/TOF-based system. Finding the mobile device location from four TDOA measurements from five transmitters requires three homogeneous linear equations to be simultaneously solved, with concomitant tradeoffs on result certainty, accuracy, run time, and coding complexity. Although there are many robust linear algebraic methods, such as singular value decomposition or Gaussian elimination, which can solve for the three coordinates of the location of the mobile device, none of these methods are able to deliver a result having all of: high accuracy, high confidence, and fast answer determination. Rapidly determining the location of the mobile device by triangulation/trilateration/multilateration techniques in real time is critical, especially if the mobile device has moved while waiting for the TDOA-based system to complete its computations.

Accordingly, it would be desirable to reduce the number of transmitters in such TDOA-based locationing systems, to reduce the computational burden in such TDOA-based locationing systems, and to rapidly and accurately locate and track mobile devices in venues in which such TDOA-based locationing systems are deployed.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
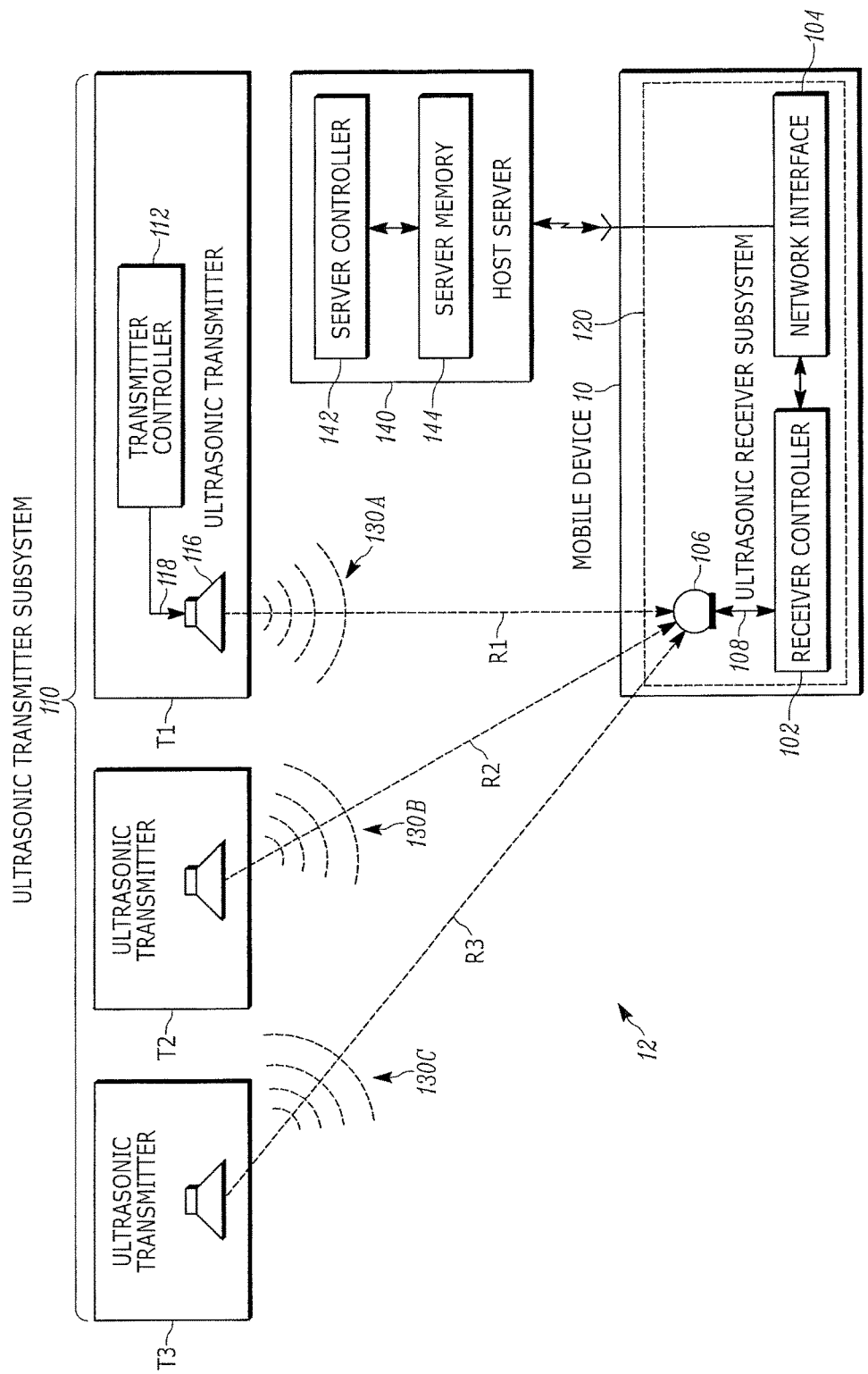
FIG. 1 is a block diagram of an arrangement for locating and tracking a mobile device in a venue in which a TDOA-based ultrasonic locationing system is deployed in accordance with the present disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The arrangement and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of this disclosure relates to an arrangement for locating and tracking a mobile device that is movable in a venue. The mobile device can be any electronic device, such as a handheld radio frequency (RF) identification (RFID) tag reader for capturing data from RFID tags, a handheld bar code symbol reader for capturing data from bar code symbols, a smartphone, a tablet, a computer, a radio, a product or employee identifier, or any like electronic device. The venue can be any environment, such as a retail store, a factory, a warehouse, a distribution center, a building, or any like indoor or outdoor controlled area.

The arrangement includes a time difference of arrival (TDOA)-based ultrasonic locationing system having a plurality of ultrasonic transmitters that are spaced apart of one another at fixed, known locations in the venue, and a receiver that is spaced away from the transmitters and that is supported by, and movable with, the mobile device in the venue. The ultrasonic transmitters transmit a plurality of ultrasonic ranging signals at a plurality of transmit timer values. Preferably, the transmitters transmit the ultrasonic ranging signals, one at a time, in a timed sequence of pulses, and periodically repeat the sequence over successive time periods. The receiver receives the ultrasonic ranging signals at a plurality of receive timer values.

A controller determines a current, real-time position of the mobile device based on differences between the transmit timer values and the receive timer values. However, the controller in a TDOA-based system only knows the receive timer values, and does not know the transmit timer values. Hence, in accordance with this disclosure, the controller infers the transmit timer values, and then determines the current, real-time position of the mobile device based on differences between the inferred transmit timer values and the known receive timer values.

More particularly, the controller infers the transmit timer values by selecting a plurality of sets of possible transmit timer values, by successively processing the sets of possible transmit timer values, and by selecting from the processed sets an optimum set of the possible transmit timer values as the inferred transmit timer values. The transmitters transmit their respective ranging signals along radial distances that define circles that intersect each other at intersection points. The controller processes the sets of possible transmit timer values by disregarding any set where a number of the intersection points is less than a predetermined number, by determining a centroid or geometric center from all the intersection points, by discarding an intersection point from each pair of circles that is farther away from the centroid than another remaining intersection point from the same pair of circles, and by minimizing a generally triangular area created by the remaining intersection points. Advantageously, the transmitters are arranged in groups of three transmitters, in which case the controller disregards any set where the number of the intersection points is less than six.

Another aspect of this disclosure relates to a method of locating and tracking a mobile device that is movable in a venue. The method is performed by spacing a plurality of ultrasonic transmitters apart of one another at fixed, known locations in the venue, by transmitting from the transmitters a plurality of ultrasonic ranging signals at a plurality of unknown transmit timer values, by spacing a receiver away from the transmitters, by supporting the receiver on the mobile device for joint movement therewith in the venue, by receiving the ultrasonic ranging signals at a plurality of known receive timer values, by inferring the transmit timer values, and by determining a current, real-time position of the mobile device based on differences between the inferred transmit timer values and the known receive timer values.

In accordance with this disclosure, the receiver determines or infers the transmit timer values, the number of transmitters in such a TDOA-based locationing system has been reduced, and the computational burden has also been reduced. The position or location of the mobile device is more rapidly and more accurately determined, because, among other factors, it is no longer necessary to wait for the TDOA-based locationing system to solve any complex equations and complete any intensive computations for finding the point of intersection among multiple hyperboloids.

Referring now to the drawings, reference numeral 10 identifies a mobile device 10 movable in a venue 12. The mobile device 10 can be any electronic device, such as a handheld radio frequency (RF) identification (RFID) tag reader, a handheld bar code symbol reader, a smartphone, a tablet, a computer, a radio, a product or employee identifier, or any like device. The venue 12 can be any environment, such as a retail store, a factory, a warehouse, a distribution center, a building, or any like indoor or outdoor controlled area. A real-time, time difference of arrival (TDOA)-based ultrasonic locationing system is deployed in the venue 12 to determine the location, and to track the position, of the mobile device 10 in the venue 12. The locationing system includes an ultrasonic transmitter subsystem 110 for transmitting ultrasonic ranging signals 130A, 130B, and 130C at respective transmit timer values to an ultrasonic receiver subsystem 120.

As shown in FIG. 1, the ultrasonic transmitter subsystem 110 includes a plurality of ultrasonic transmitters T1, T2, T3 that are spaced apart at known, fixed locations in the venue, for example, by being mounted overhead on a ceiling. The ultrasonic receiver subsystem 120 is mounted on, and is jointly movable with, the mobile device 10 below the ceiling. Each ultrasonic transmitter T1, T2, T3 periodically transmits the ultrasonic ranging signals 130A, 130B, 130C, preferably in short bursts or ultrasonic pulses (see also FIG. 2), which are received by the ultrasonic receiver subsystem 120 on the mobile device 10 at respective receive timer values. Although only three ultrasonic transmitters T1, T2, T3 have been illustrated in FIG. 1, it will be understood that many more than three could be, and often are, provided in a particular venue 12. For example, some venues may have eighteen, thirty, or more transmitters, preferably arranged in groups composed of a plurality, e.g., three, of transmitters in each group.

A host server 140, also known as a backend server, is operatively connected over a wireless connection to the receiver subsystem 120 in the mobile device 10. The host server 42 has a programmed microprocessor or server controller 142 that controls the receiver subsystem 120 and the mobile device 10, and a server memory 144 for storing data and programs under the control of the server controller 142.

Figure 2:
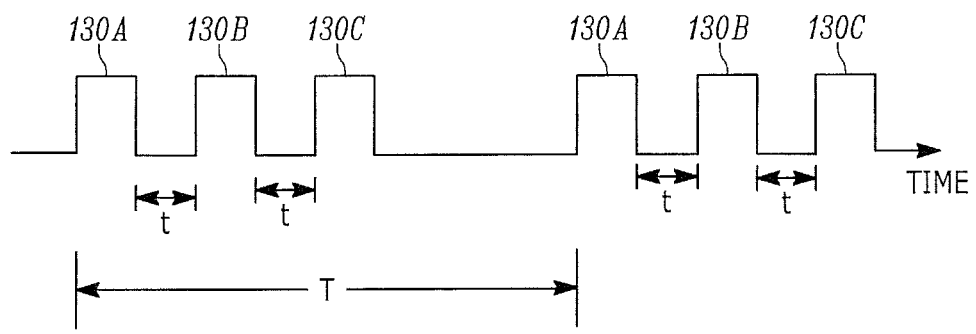
FIG. 2 is a diagram of a timed sequence of ultrasonic ranging signals transmitted at transmit timer values by the TDOA-based system of FIG. 1.

A programmed microprocessor or transmitter controller 112 generates a transmit drive signal on line 118 to drive an emitter 116, preferably a voice coil speaker, but could also be a piezoelectric speaker, in each transmitter T1, T2, T3 of the transmitter subsystem 110. The non-illustrated components for ultrasonic transmitters T2 and T3 are the same as those shown for the ultrasonic transmitter T1. As shown in FIG. 2, the ultrasonic transmitters T1, T2, T3 emit their ultrasonic ranging signals 130A, 130B, 130C as pulses at their respective transmit timer values that are staggered timewise apart such that the receiver subsystem 120 on the mobile device 10 will not receive overlapping ranging signals from the different ultrasonic transmitters. For example, the time "t" between the ranging signals 130A and 130B is preferably 200 ms apart, and the same time "t" between the ranging signals 130B and 130C is also preferably 200 ms apart. The sequence of all the ranging signals 130A, 130B, and 130C is repeated every time period "T", which, for example, may be 1 second in duration. Different numerical values for "t" and "T" are also contemplated.

The receiver subsystem 120 includes a transducer or receiver, such as an existing microphone 106, on the mobile device 10 to receive the ranging signals at the respective receive timer values, and to convert each ultrasonic ranging signal 130A, 130B, and 130C to an electrical signal on line 108 that is processed by an existing programmed microprocessor or receiver controller 102. A network interface 104 at the output of the receiver controller 102 provides wireless communication with the server controller 142 of the host server 140. For example, Wireless Fidelity (Wi-Fi) and Bluetooth® are open wireless standards for exchanging data between electronic devices.

A controller, e.g., the server controller 142 and/or the receiver controller 102, determines a current, real-time position of the mobile device 10 based on flight time differences between the transmit timer values and the receive timer values. However, as explained above, the controller in a TDOA-based system only knows the receive timer values, and does not know the transmit timer values. Hence, in accordance with this disclosure, the controller infers the transmit timer values, and then determines the current, real-time position of the mobile device 10 based on differences between the inferred transmit timer values and the known receive timer values. Preferably, the controller infers the transmit timer values by selecting a plurality of sets of possible transmit timer values, by successively processing the sets of possible transmit timer values, and by selecting from the processed sets an optimum set of the possible transmit timer values as the inferred transmit timer values.

For example, as shown in FIGS. 3-6, the transmitters T1, T2, T3 periodically transmit their respective ranging signals 130A, 130B, 130C along respective radial distances R1, R2, R3 that define respective circles. The receiver controller 102 has a timer or counter 20 (see FIG. 8) for recording timer count values indicative of when the ranging signals 130A, 130B, 130C are received. As described above, the physical locations of the transmitters T1, T2, T3 are known, and the staggered times "t", e.g., 200 ms, between the ranging signals 130A, 130B, 130C are also known. What is not known to the server controller 142 and/or the receiver controller 102 is the transmit timer values of the first transmitter T1. For the sake of the following discussion, it will be assumed that the mobile device is at a constant height above the floor and below the ceiling in the venue, and that the counter value was 100100 ms when the first transmitter T1 transmitted the ranging signal 130A, but, to repeat, the server controller 142 and/or the receiver controller 102 do not know this. It will also be assumed that the counter value was 100111 ms when the ranging signal 130A was received, that the counter value was 100310 ms when the ranging signal 130B was received, and that the counter value was 100521 ms when the ranging signal 130C was received.

Figure 3:
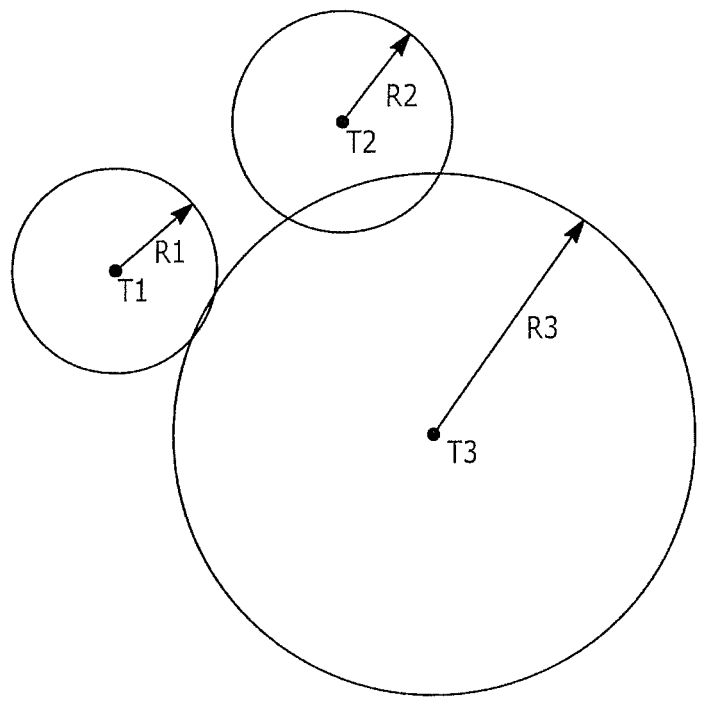
FIG. 3 is an explanatory diagram showing how the arrangement of FIG. 1 infers the transmit timer values in a first search of possible transmit timer values in accordance with the present disclosure.

In a first search, as illustrated by FIG. 3, the controller selects a first set of possible transmit timer values, for example, that the counter value was 100102 ms when the ranging signal 130A was received, that the counter value was 100302 ms when the ranging signal 130B was received, and that the counter value was 100502 ms when the ranging signal 130C was received. In this first search, assuming that sound travels at about 1.126 feet per millisecond at room temperature in the venue, the controller determines that:

$R1 = 100111$ ms $- 100102$ ms $= 9$ ms $= 10.13$ feet.

$R2 = 100310$ ms $- 100302$ ms $= 8$ ms $= 9.01$ feet.

$R3 = 100521$ ms $- 100502$ ms $= 19$ ms $= 21.40$ feet.

The controller processes these possible transmit timer values, and initially counts the number of intersection points between the three circles of FIG. 3 by solving equations for intersecting circles. In FIG. 3, the controller disregards the first set of possible transmit timer values, because the number of the intersection points is less than a predetermined number, in this case, six, for the three circles.

Figure 4:
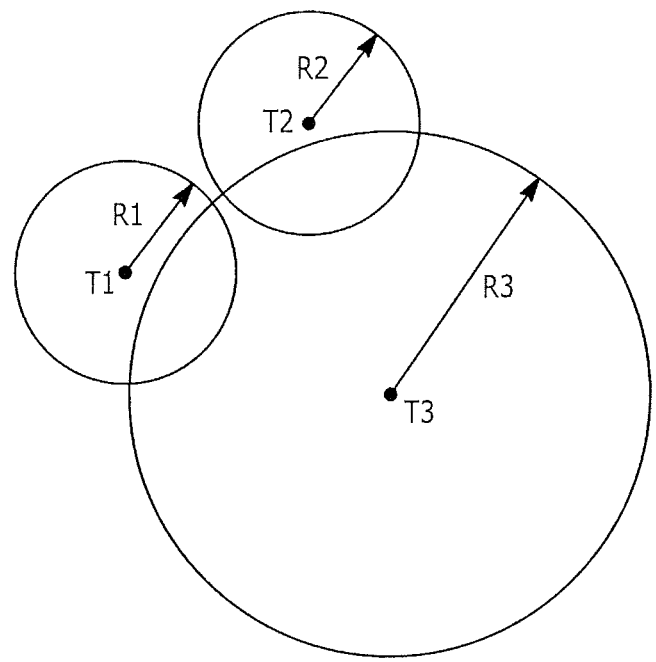
FIG. 4 is a diagram analogous to FIG. 3, and shows a second search of possible transmit timer values.

In a second search, as illustrated by FIG. 4, the controller selects a different, second set of possible transmit timer values, for example, that the counter value was 100101 ms when the ranging signal 130A was received, that the counter value was 100301 ms when the ranging signal 130B was received, and that the counter value was 100501 ms when the ranging signal 130C was received. In this second search, again assuming that sound travels at about 1.126 feet per millisecond at room temperature in the venue, the controller determines that:

$R1 = 100111$ ms $- 100101$ ms $= 10$ ms $= 11.26$ feet.

$R2 = 100310$ ms $- 100301$ ms $= 9$ ms $= 10.13$ feet.

$R3 = 100521$ ms $- 100501$ ms $= 20$ ms $= 22.52$ feet.

The controller processes these possible transmit times, and again initially counts the number of intersection points between the three circles of FIG. 4 by solving equations for intersecting circles. In FIG. 4, the controller disregards the second set of possible transmit timer values, because, as before, the number of the intersection points is less than a predetermined number, in this case, six.

Figure 5:
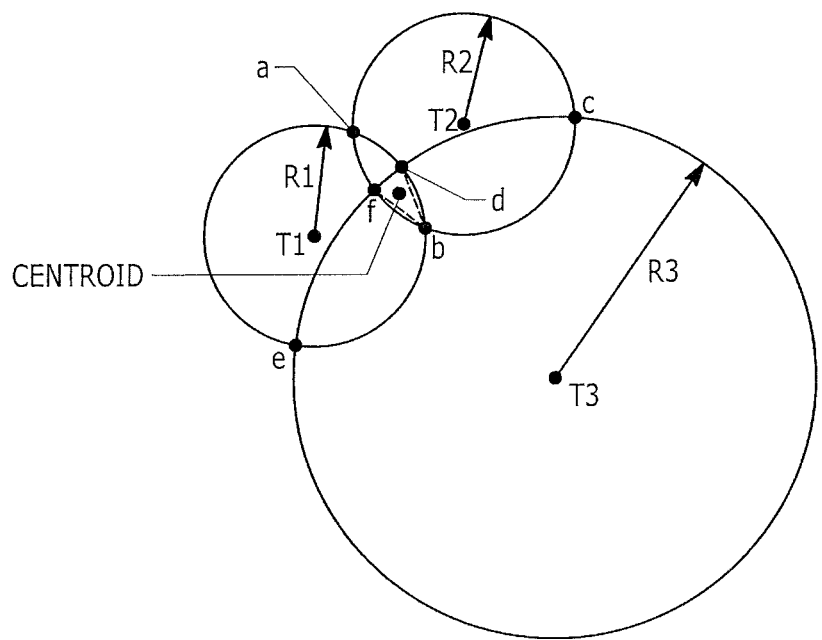
FIG. 5 is a diagram analogous to FIG. 4, and shows a third search of possible transmit timer values.

In a third search, as illustrated by FIG. 5, the controller selects a different, third set of possible transmit timer values, for example, that the counter value was 100100 ms when the ranging signal 130A was received, that the counter value was 100300 ms when the ranging signal 130B was received, and that the counter value was 100500 ms when the ranging signal 130C was received. In this third search, again assuming that sound travels at about 1.126 feet per millisecond at room temperature in the venue, the controller determines that:

$$R1=100111 \text{ ms}-100100 \text{ ms}=11 \text{ ms}=12.39 \text{ feet.}$$

$$R2=100310 \text{ ms}-100300 \text{ ms}=10 \text{ ms}=11.26 \text{ feet.}$$

$$R3=100521 \text{ ms}-100500 \text{ ms}=21 \text{ ms}=23.65 \text{ feet.}$$

The controller processes these possible transmit timer values, and again initially counts the number of intersection points between the three circles of FIG. 5 by solving equations for intersecting circles. In FIG. 5, the controller does not disregard the third set of possible transmit timer values, because the number of the intersection points is equal to the predetermined number of six. In FIG. 5, the intersection points are labeled a, b, c, d, e, and f.

Hence, the controller continues the processing of the third set of possible transmit timer values by determining a centroid or geometric center of all the intersection points a, b, c, d, e, and f, and by discarding an intersection point from each pair of circles that is farther away from the centroid than another remaining intersection point from the same pair of circles. Thus, points a and b are on the same circle pair, but point a is discarded because point b is closer to the centroid; points d and e are on the same circle pair, but point e is discarded because point d is closer to the centroid; and points c and f are on the same circle pair, but point c is discarded because point f is closer to the centroid.

The controller continues the processing of the third set of possible transmit timer values by measuring a generally triangular area created by the remaining intersection points b, d, and f. In this case, the measured area is, for example, about 1.3 square feet.

Figure 6:
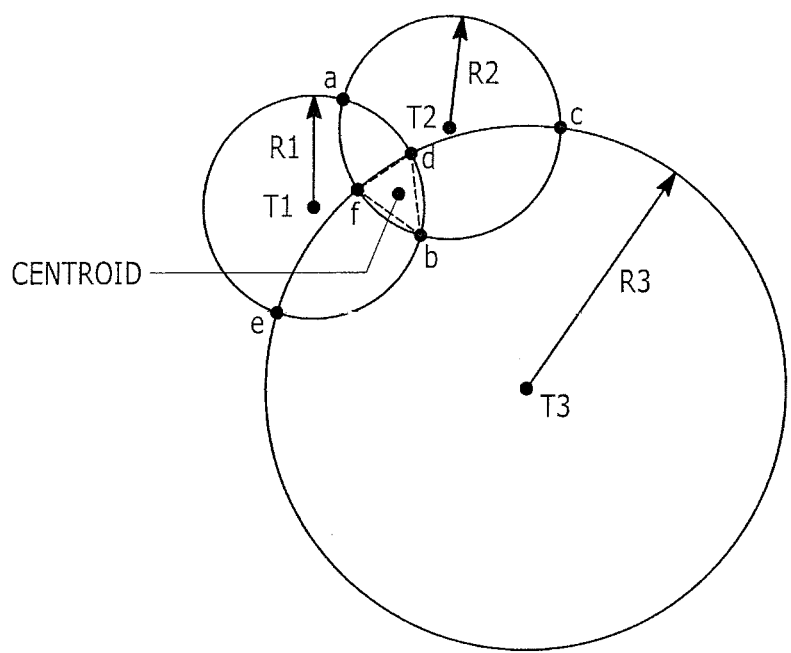
FIG. 6 is a diagram analogous to FIG. 5, and shows a fourth search of possible transmit timer values.

In a fourth search, as illustrated by FIG. 6, the controller selects a different, fourth set of possible transmit timer values, for example, that the counter value was 100099 ms when the ranging signal 130A was received, that the counter value was 100299 ms when the ranging signal 130B was received, and that the counter value was 100499 ms when the ranging signal 130C was received. In this fourth search, again assuming that sound travels at about 1.126 feet per millisecond at room temperature in the venue, the controller determines that:

$$R1=100111 \text{ ms}-100099 \text{ ms}=12 \text{ ms}=13.51 \text{ feet.}$$

$$R2=100310 \text{ ms}-100299 \text{ ms}=11 \text{ ms}=12.39 \text{ feet.}$$

$$R3=100521 \text{ ms}-100499 \text{ ms}=22 \text{ ms}=24.77 \text{ feet.}$$

The controller processes these possible transmit timer values, and again initially counts the number of intersection points between the three circles of FIG. 6 by solving equations for intersecting circles. In FIG. 6, the controller does not disregard the fourth set of possible transmit timer values, because the number of the intersection points is again equal to the predetermined number of six. In FIG. 6, the intersection points are again labeled a, b, c, d, e, and f.

Hence, the controller continues the processing of the fourth set of possible transmit timer values by determining the centroid of all the intersection points a, b, c, d, e, and f, and by discarding an intersection point from each pair of circles that is farther away from the centroid than another remaining intersection point from the same pair of circles. Thus, as before, points a and b are on the same circle pair, but point a is discarded because point b is closer to the centroid; points d and e are on the same circle pair, but point e is discarded because point d is closer to the centroid; and points c and f are on the same circle pair, but point c is discarded because point f is closer to the centroid.

The controller continues the processing of the fourth set of possible transmit timer values by measuring a generally triangular area created by the remaining intersection points b, d, and f. In this case, the measured area is, for example, about 4.7 square feet.

The controller now stops selecting additional sets of possible transmit timer values, because it has found the minimal area of the generally triangular area in the third search. The third set of possible transmit timer values, which produced the minimal area, i.e., 1.3 square feet, that is, of course, less than 4.7 square feet, is thus now considered the optimum set, and the third set of possible transmit timer values is now used by the controller as the inferred transmit timer values. The inferred transmit timer values thus correspond to counter values 100100, 100300, and 100500 for the ranging signals 130A, 130B, 130C, and are repeated every time period T. The controller determines the current, real-time position of the mobile device 10 based on the flight time difference between the inferred transmit timer values that the ranging signals 130A, 130B, 130C were transmitted and the known receive timer values that the ranging signals 130A, 130B, 130C were received along each direct radial distance R1, R2, R3, together with the known speed of the ranging signals 130A, 130B, 130C, as well as the known and fixed locations and positions of the transmitters T1, T2, T3. Additional transmitters can further locate the position of the mobile device 10, using any suitable locationing technique, such as triangulation, trilateration, multilateration, etc.

The search examples given above are merely exemplary. For example, more or less than four search iterations may be needed. Also, each iteration or count value need not be 1 ms away from the previous iteration, but larger size iterations may be employed. A larger size of the iteration expedites the processing time, but at the expense of accuracy. The possible transmit timer values should be selected from a large range of possible transmit timer values in which the actual transmit timer values are contained.

Figure 7:
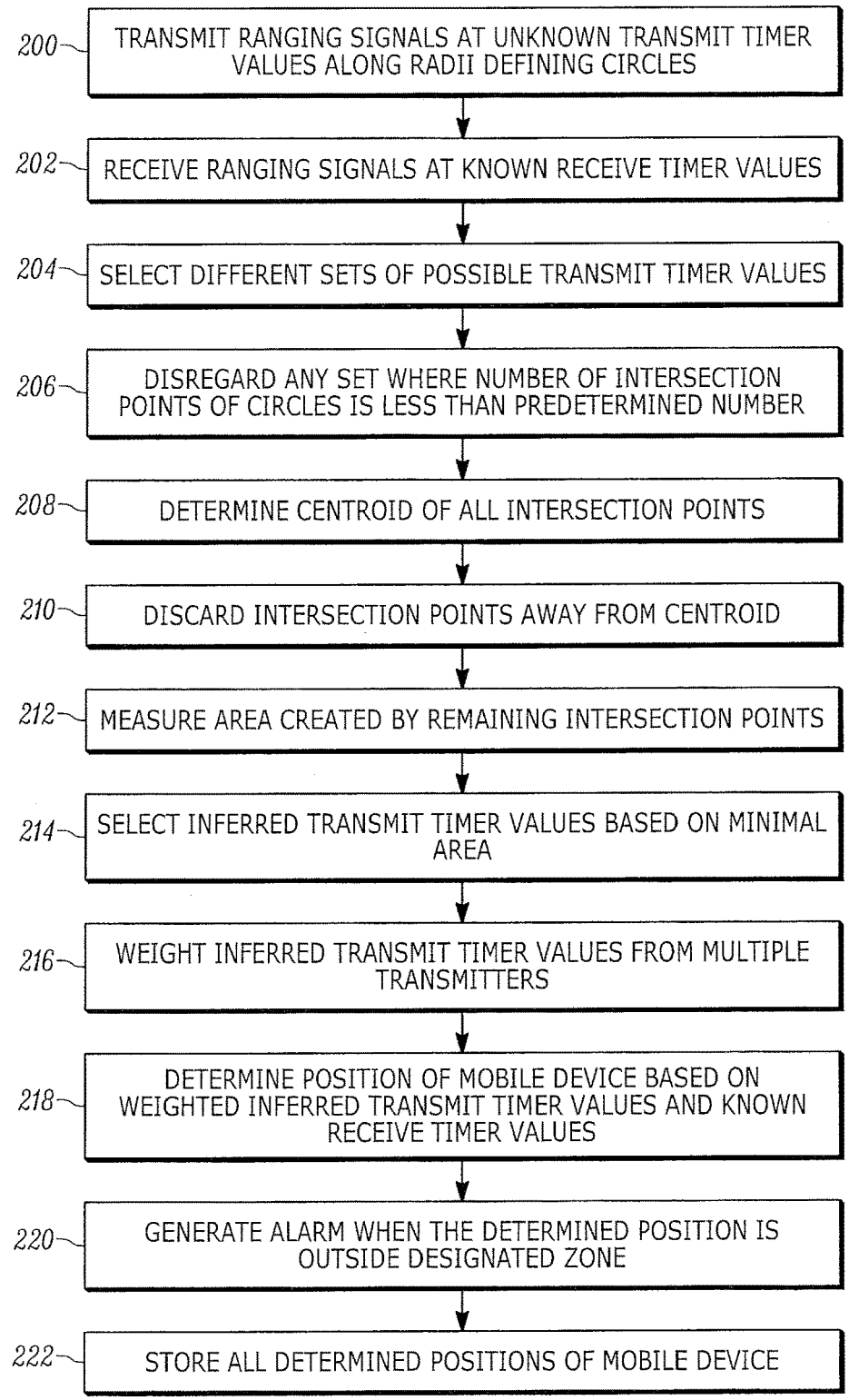
FIG. 7 is a flow chart depicting steps performed in accordance with the method of the present disclosure

The above-disclosed method is performed, as shown in the flow chart of FIG. 7, by periodically transmitting a plurality of ranging signals 130A, 130B, 130C at unknown transmit timer values along radial distances R1, R2, R3 that define respective circles by operation of a transmitter subsystem 110 in step 200, and by receiving the ranging signals 130A, 130B, 130C at known receive timer values by operation of a receiver subsystem 120 in step 202. The subsystems 110, 120 are spaced apart from each other in a venue 12, and the receiver subsystem 120 is supported on a mobile device 10 for joint movement therewith in the venue 12.

The method is further performed by selecting a plurality of different sets of possible transmit timer values in step 204, by disregarding any set where a number of the intersection points of the circles is less than a predetermined number in step 206, by determining a centroid or geometric center of all the intersection points in step 208, by discarding an intersection point from each pair of circles that is farther away from the centroid than another remaining intersection point from the same pair of circles in step 210, by measuring a generally triangular area created by the remaining intersection points in step 212, by selecting an optimal set of possible transmit timer values as the inferred transmit timer values based on the minimal triangular area in step 214, by weighting the inferred transmit timer values from groups of multiple transmitters in step 216, and by determining the position of the mobile device 10 based on the weighted inferred transmit timer values in step 218. Statistical standard deviation analysis may also be performed on the weighted inferred transmit timer values. Once the weighted, and statistically analyzed, inferred transmit timer values are known, other system events may be time-correlated.

In one advantageous embodiment, the method continues by generating an alarm when the determined position of the mobile device 10 is outside a designated zone in the venue 12 in step 220. This is useful for preventing theft when the mobile device 10 is attached to a product, especially an expensive item. In addition, all the determined positions of the mobile device 10 may be stored in a historical log for subsequent retrieval in step 222.

Figure 8:
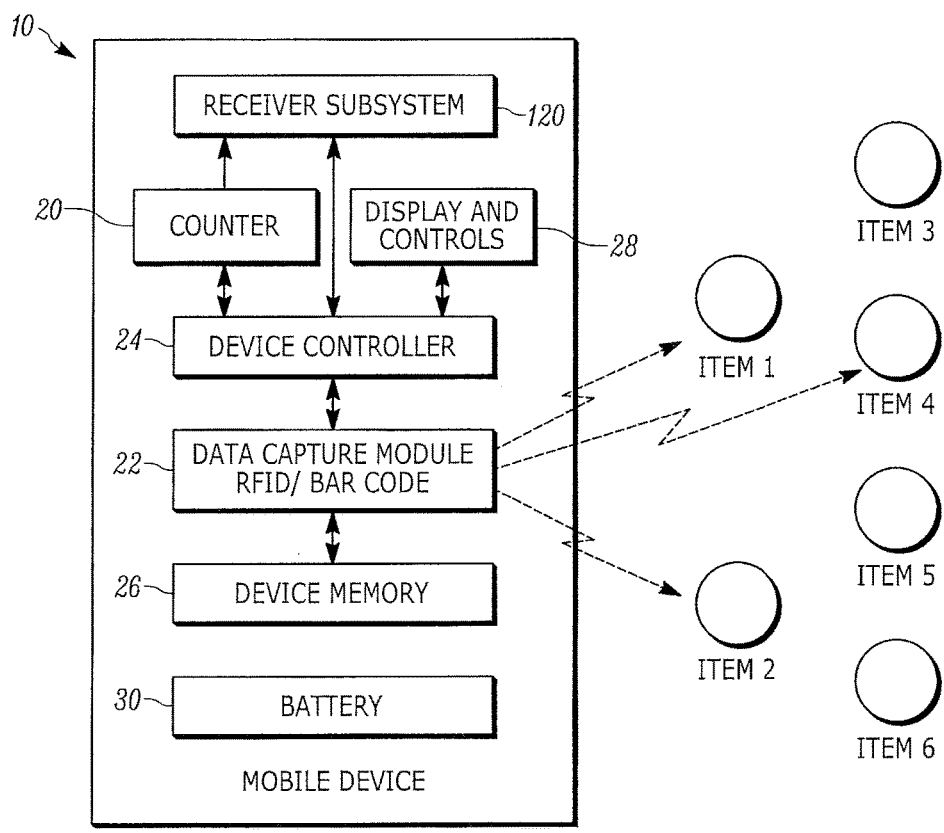
FIG. 8 is a block diagram of components in the mobile device.

FIG. 8 depicts in a block diagram form various components of the mobile device 10 configured as a handheld data capture device. A data capture module 22 is operated to read either RFID tags or bar code symbols associated with products or items 1-6. A device controller 24 controls all the components in the mobile device 10 and can access data stored in a device memory 26. The aforementioned receiver subsystem 120 and the aforementioned counter 20, which can also be a clock, are jointly movable with the device 10. The device 10 also includes an interface 28 having a display and controls, such as an auditory/visual indicator, as well as a battery 30 for electrically powering all the components. The various steps 204-222 described above in connection with FIG. 7 may be entirely or partially performed by the server controller 142 that communicates by wireless link to the mobile device 10.

In addition, the various steps 204-222 described above in connection with FIG. 7 may be performed entirely by the device controller 24, in which case, the wireless link to the mobile device 10 is not needed. In this so-called "no-radio" version of the mobile device 10, the mobile device is advantageously programmed in advance with the fixed positions of the transmitters, with the timing sequence of the ranging signals, and with the boundaries of designated zones in the venue. The device controller 24 determines when the mobile device is outside a designated zone, and responsively generates an audible and/or visual alarm.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An arrangement for locating and tracking a mobile device movable in a venue, the arrangement comprising:
   a time difference of arrival (TDOA)-based ultrasonic locationing system including a plurality of ultrasonic transmitters that are spaced apart of one another at fixed, known locations in the venue, the ultrasonic transmitters being operative for transmitting a plurality of ultrasonic ranging signals at a plurality of transmit timer values, and a receiver spaced away from the transmitters and being supported by, and movable with, the mobile device in the venue, the receiver being operative for receiving the ultrasonic ranging signals at a plurality of receive timer values; and
   a controller for inferring the transmit timer values that are unknown to the controller, and for determining a current, real-time position of the mobile device based on differences between the transmit timer values inferred by the controller and the receive timer values that are known to the controller
   wherein the controller infers the transmit timer values by selecting a plurality of sets of possible transmit timer values, by successively processing the sets of possible transmit timer values, and by selecting from the processed sets an optimum set of the possible transmit timer values as the inferred transmit timer values.

2. The arrangement of claim 1, wherein the transmitters transmit the ultrasonic ranging signals, one at a time, in a timed sequence of pulses, and periodically repeat the sequence over successive time periods.

3. The arrangement of claim 1, wherein the controller is operatively connected to the receiver and is located in at least one of the mobile device and a host server remote from the mobile device.

4. The arrangement of claim 1, wherein the transmitters transmit their respective ranging signals along radial distances that define circles that intersect each other at intersection points; and wherein the controller is configured to process the sets of possible transmit timer values by disregarding any set where a number of the intersection points is less than a predetermined number, by determining a centroid of all the intersection points, by discarding an intersection point from each pair of circles that is farther away from the centroid than another remaining intersection point from the same pair of circles, and by minimizing a generally triangular area created by the remaining intersection points.

5. The arrangement of claim 4, wherein the transmitters are arranged in groups of three transmitters, and wherein the controller disregards any set where the number of the intersection points is less than six.

6. The arrangement of claim 4, wherein the controller infers the transmit timer values for each group, and weights the inferred transmit timer values from all the groups to obtain weighted inferred transmit timer values.

7. The arrangement of claim 1, wherein the receiver has a counter for recording the known receive timer values of the ranging signals.

8. The arrangement of claim 1, wherein the controller generates an alarm when the determined position of the mobile device is outside a designated zone in the venue.

9. The arrangement of claim 1, wherein the controller stores all the determined positions of the mobile device.

10. A method of locating and tracking a mobile device movable in a venue, the method comprising:
    spacing a plurality of ultrasonic transmitters apart of one another at fixed, known locations in the venue;
    transmitting from the transmitters a plurality of ultrasonic ranging signals at a plurality of unknown transmit timer values;
    spacing a receiver away from the transmitters;
    supporting the receiver on the mobile device for joint movement therewith in the venue;
    receiving the ultrasonic ranging signals at a plurality of known receive timer values;
    inferring the transmit timer values; and
    determining a current, real-time position of the mobile device based on differences between the inferred transmit timer values and the known receive timer values,
    wherein the inferring of the transmit timer values is performed by selecting a plurality of sets of possible transmit timer values, by successively processing the sets of possible transmit timer values, and by selecting from the processed sets an optimum set of the possible transmit timer values as the inferred transmit timer values.

11. The method of claim 10, wherein the transmitting of the ultrasonic ranging signals is performed, one at a time, in a timed sequence of pulses, and periodically repeating the sequence over successive time periods.

12. The method of claim 10, wherein the inferring of the transmit timer values and the determining of the position of the mobile device are performed in at least one of the mobile device and a host server remote from the mobile device.

13. The method of claim 10, wherein the transmitting of the ranging signals is performed along radial distances that define circles that intersect each other at intersection points; and wherein the processing of the sets of possible transmit timer values is performed by disregarding any set where a number of the intersection points is less than a predetermined number, by determining a centroid of all the intersection points, by discarding an intersection point from each pair of circles that is farther away from the centroid than another remaining intersection point from the same pair of circles, and by minimizing a generally triangular area created by the remaining intersection points.

14. The method of claim 13, and arranging the transmitters in groups of three transmitters, and disregarding any set where the number of the intersection points is less than six.

15. The method of claim 14, wherein the inferring of the transmit timer values is performed for each group, and weighting the inferred transmit timer values from all the groups to obtain weighted inferred transmit timer values.

16. The method of claim 10, and recording the known receive timer values of the ranging signals.

17. The method of claim 10, and generating an alarm when the determined position of the mobile device is outside a designated zone in the venue.

18. The method of claim 10, and storing all the determined positions of the mobile device.

* * * * *